(12) United States Patent
Okada

(10) Patent No.: US 6,430,222 B1
(45) Date of Patent: Aug. 6, 2002

(54) MOVING PICTURE CODING APPARATUS

(75) Inventor: Hiroyuki Okada, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/348,658

(22) Filed: Jul. 6, 1999

(30) Foreign Application Priority Data

Aug. 31, 1998 (JP) .......................................... 10-246164

(51) Int. Cl.[7] .............................................. H04N 7/50
(52) U.S. Cl. ........................... 375/240.03; 375/240.12; 708/203
(58) Field of Search ....................... 375/240.03, 240.12; 708/203; H04N 7/50

(56) References Cited

U.S. PATENT DOCUMENTS

| | | | | |
|---|---|---|---|---|
| 5,526,052 A | * | 6/1996 | Ar ........................ | 375/240.03 |
| 5,565,921 A | | 10/1996 | Sasaki et al. .......... | 375/240.13 |
| 5,623,424 A | * | 4/1997 | Azadegan et al. .......... | 708/203 |
| 5,689,307 A | | 11/1997 | Sugahara et al. ........ | 348/419.1 |
| 5,790,695 A | * | 8/1998 | Suwa .................... | 375/240.03 |
| 5,929,912 A | * | 7/1999 | Aono et al. ............. | 375/240.03 |
| 5,990,957 A | * | 11/1999 | Ryoo ...................... | 375/240.3 |
| 6,088,392 A | * | 7/2000 | Rosenberg ............. | 375/240.03 |
| 6,339,657 B1 | * | 1/2002 | Yamaguchi et al. ... | 375/240.03 |

FOREIGN PATENT DOCUMENTS

| | | |
|---|---|---|
| EP | 0 720 385 A2 | 7/1996 |
| EP | 0 757 490 A2 | 2/1997 |
| JP | 6-30402 A | 2/1994 |
| JP | 8-181992 A | 7/1996 |

OTHER PUBLICATIONS

Lee et al, "On the Error Distribution and Scene Change for the Bit Rate Control of MPEG", IEEE Transactions on Consumer Electronics, US, IEEE Inc. New York, vol. 39, No. 3, Aug. 1 1993, pp. 545–554.

Plompen et al, An Image Knowledge Based Video Codec for Low Bitrates, SPIE 87, The International Society for Optical Engineering, Apr. 3, 1987, pp. 1–12.

* cited by examiner

Primary Examiner—Howard Britton
(74) Attorney, Agent, or Firm—Nicon & Vanderhye, .P. C.

(57) ABSTRACT

The coding mode determining section, when receiving the information as to occurrence of a scene change from the scene change detector, outputs a piece of mode control information to the coding controller. The coding controller, based on the amount of coding in the coder and the mode control information, controls the quantizer by setting up a quantization stepsize so that the current frame will have the target amount of coding. In this way, the quantization and coding are controlled by three stages, i.e., immediately after a scene change, from the scene change to the stabilization of the amount of coding, and after the stabilization of the amount of coding, to thereby prevent degradation of picture quality.

5 Claims, 8 Drawing Sheets

MOVING PICTURE CODING APPARATUS

BACKGROUND OF THE INVENTION (1) Field of the Invention

The present invention relates to a moving picture coding apparatus which performs an orthogonal transform of an input picture by dividing it into two-dimensional blocks and quantizes and codes the data, and more particularly relates to a moving picture coding apparatus which quantizes and codes data of picture by extracting a specific area from the frame of picture in a manner so as to enhance the picture quality of the extracted area.

(2) Description of the Related Art

Recently, visual communications services such as video telephone, video conference etc., show great prospect as an efficient way of using ISDN (Integrated Services Digital Network) and GSTN (General Switched Telephone Network) services. Therefore, investigations into high efficiency coding techniques aiming at efficient transmission of such moving pictures have been intensively carried out. Investigations of these techniques were based on statistic properties of pictures to remove redundancy contained in the pictures to thereby reduce the amount of information. As the coding techniques, the hybrid coding technique is well known which is a combination of motion-compensated prediction and the discrete cosine transform.

However, in the case of transmission at a low bit rate, the quality of the regenerated picture is degraded due to noise generation. Hence, improvement against this has been desired. As a method for improvement of picture quality, a technique has been investigated in which specific areas are extracted from the input picture so that the quantization stepsize is controlled separately for each area. As an example of this, there is an idea for improving the picture quality subjectively, by extracting the face area from the input picture so that areas excepting the face area hereinafter referred to as 'background' will be quantized based on a quantization stepsize greater than that for the face area, to thereby reduce the amount of coding allotted for these areas while a greater amount of coding will be allotted for the face area (for example, R. H. J. M. Plompen, et al.: "An image knowledge based video codec for low bitrates", SPIE Vol. 804 Advanced in image processing (1987)).

Referring now to FIG. 1, a conventional example using motion compensated prediction and a two-dimensional orthogonal transform will be explained. In FIG. 1, the conventional system includes: a frame memory section 81; a subtracter 82; an orthogonal transformer 83; a quantizer 84; a coding section 85; a buffer memory section 86; an inverse quantizer 87; an inverse orthogonal transformer 88; an adder 89; a frame memory section 90; a motion detecting section 91; a motion compensation predicting section 92; an area extracting section 93; and a coding control section 94.

Now, suppose a picture is input to frame memory section 81. The input picture is a digitized picture obtained from a video camera or the like, and is stored in frame memory section 81 and is divided into blocks of N×M pixels (N and M are natural numbers). The picture stored in frame memory section 90 and the picture stored in frame memory section 81 are input to motion detecting section 91 where the motion vectors are detected. In motion compensation predicting section 92, motion compensated prediction values are determined based on the motion vectors and the picture stored in frame memory section 90. The power of the differences between the motion compensated prediction values and the input picture and the power of the input picture are compared to choose interframe prediction or intraframe prediction.

In subtracter 82, the difference between the input picture in frame memory section 81 and motion compensated prediction value from motion compensated predicting section 92 is calculated for each block unit. Orthogonal transformer 83 implements the two-dimensional orthogonal transform of the pixels in each block and outputs the transform coefficients to quantizer 84. Quantizer 84 quantizes the transform coefficients based on the quantization stepsize output from coding control section 94. Coding section 85 implements entropy coding of the quantized output from quantizer 84 to generate coded information. Buffer memory section 86 accumulates the coded information in order to make the system capacity match the transmission rate of the network.

The output from quantizer 84 is also input to inverse quantizer 87, where it is inverse quantized to produce transform coefficients. In inverse orthogonal transformer 88, the transform coefficients are subjected to the two-dimensional inverse orthogonal transform, and the result and the motion compensated prediction value from motion compensation predicting section 92 are added in adder 89. The thus added picture is stored in frames memory section 90 to be used in the next process. Coding controlling section 94 receives valid/invalid information about the face area and the background area as the output from area extracting section 93 and the occupied amount of buffer memory section 86, and determines the quantization stepsize based on these pieces of information. For example, the valid information indicating the face area and the invalid information indicating the background area are output from area extracting section 93 to coding controlling section 94, which chooses a quantization stepsize for the face area smaller than that for the background area, based on the quantization stepsize determined from the occupied amount of buffer memory section 86.

The above technique only sets two levels of quantization stepsize for the face area and the background area, and only specifies the fact that the quantization stepsize for the face area is smaller than that for the background area. Therefore, for actual application of this configuration to a real moving picture coding apparatus, the following operation may and should be done, for instance. Coding controlling section 94 defines dQf, dQb, which are the amounts of displacement for the extracted result from the area extracting section for the quantization stepsize Q which is determined based on the occupied amount of the coded information in buffer memory section 86. Quantizer 84 quantizes the data for the face area using Q−dQf and the data for the background using Q+dQb.

However, in this method, noise etc. existing in the background will also be quantized even though the quantization stepsize is set large, an increased amount of coding arises, which means a reduction in the amount of coding which can be allotted to the face area. Further, since a picture greatly differs from the previous frame when a scene change occurs, if the amount of coding for the background is low, the picture quality of the background area will not become stabilized at an early stage and the reproduced picture becomes rough and ugly, tending to cause block distortion and mosquito noise around the face area due to sharp increase in amount of coding.

Since only the occupied amount of the coded information in buffer memory 86 is referred to when coding controlling section 94 performs control, the quantization stepsize is determined for that buffer's occupied amount, which makes it difficult to attain the desired, proper, amount of coding. Consequently, variations in picture quality become large between frames, lowering the picture quality.

Moreover, though frames after a scene change, in general, have strong correlation, it is difficult to control quantization so as to attain the target, proper, amount of coding since this system does not use the information from the quantization stepsize of the previous frame or the information as to the amount of coding.

When the amount of displacement of Q (dQf) is kept fixed independent of the size of the face area, the amount of coding per frame may become too high or too low with respect to the target amount of coding depending upon the size of the face area, resultantly the picture quality of the reproduced picture is degraded.

SUMMARY OF THE INVENTION

It is therefore an object of the present invention to provide a moving picture coding apparatus which can improve the picture quality by adaptively controlling the quantization and coding in multiple stages after a scene change when a scene change is detected.

In order to achieve the above object, the present invention is configured as follows:

In accordance with the first aspect of the invention, a moving picture coding apparatus includes:

- a motion detecting means for detecting motion vectors by dividing the input picture into blocks of N×M pixels (N and M are natural numbers) and determining the interframe difference for each block between the current frame and the previous frame;
- a motion compensation predicting means for determining motion compensated prediction values from the motion vectors to select interframe prediction or interframe prediction;
- an orthogonal transforming means for obtaining transform coefficients by performing an orthogonal transform of the difference between the input picture and the motion compensated prediction values;
- a quantizing means for quantizing the transform. coefficients;
- a coding means for coding the quantized transform coefficients to generate coded information;
- a block skip determining means for determining blocks to skipped without coding, based on the interframe difference, determined by the motion detecting means, between the current frame and the previous frame and based on the determined result of the motion compensated prediction obtained from the motion compensation predicting means;
- a specific area extracting means for extracting specific area from the input picture;
- a scene change detecting means for detecting a scene change based on the interframe difference;
- a coding mode determining means which, when the scene change detecting means has detected a scene change, determines which mode the current state is in among three modes, the scene change frame mode for coding the scene change frame, the post-scene change mode for coding a predetermined number of frames after the occurrence of the scene change, and the specific area mode in which frames downstream are coded to improve the quality of picture of the specific area which has been extracted by the specific area extracting means; and
- a coding control means which, based on the mode determined by the coding mode determining means, controls the quantization in a manner such that a scene change frame and a predetermined number of frames downstream are quantized by setting up a quantization stepsize at the quantizing means and by using the quantization stepsize which allows no discrimination between the specific area and the area other than the specific area whilst thinning frames; and frames after the predetermined number of frames are quantized setting up a quantization stepsize at the quantizing means for increasing the coding amount of the specific area whilst restoring the original frame rate, and is characterized in that the coded information is transmitted at a predetermined frame rate by making the system capacity match the transmission rate of the network.

In accordance with the second aspect of the invention, the moving picture coding apparatus having the above first feature is characterized in that the coding control means comprises:

- an intraframe coding control means which, in the scene change frame mode, increases the amount of coding per frame by reducing the frame rate and sets up a quantization stepsize based on which the scene change frame is coded by intraframe coding without making any distinction as to the specific area;
- a scene change coding control means which, in the post-scene change mode, increases the amount of coding per frame by reducing the frame rate and sets up a quantization stepsize based on which a predetermined number of frames after a scene change are coded using the information of the previous frame without making any distinction as to the specific area;
- a specific area enhancement coding control means, which in the specific area mode, sets up a quantization stepsize in accordance with the coding amount information from the coding means, to perform coding based on the information as to skip blocks obtained from the block skip determining means and based on the information as to the specific area extracted by the specific area extracting means; and
- a switching means for selecting one of the three control signals based on the mode information from the coding mode determining means.

In accordance with the third aspect of the invention, the moving picture coding apparatus having the above second feature is characterized in that the intraframe coding control means comprises:

- a target intraframe-coding amount computing means for calculating the target coding amount of a scene change frame with the frame rate reduced;
- a quantization stepsize setting means, which sets up a quantization stepsize based on the target coding amount, using the previously prepared relationship between target coding amounts and quantization stepsizes;
- a coding limit monitoring means which, based on the maximum coding amount per frame defined by the standard, monitors whether the amount of coding in the coding means exceeds the coding limit, every predetermined number of blocks, where the coding limit is set up for every predetermined number of blocks;
- a quantization stepsize increment means for increasing the quantization stepsize when the amount of coding in the coding means exceeds the coding limit;
- a quantization stepsize adding means which adds the quantization stepsize determined by the quantization stepsize setting means and the quantization stepsize which has been increased by the quantization stepsize increment means; and an average quantization stepsize computing means for calculating the average value of the quantization stepsizes thus added, wherein all the above means are activated when the scene change frame mode information is input from the coding mode determining means.

In accordance with the fourth aspect of the invention, the moving picture coding apparatus having the above second feature is characterized in that the scene change coding control means comprises:

a target scene-change-coding amount computing means for calculating the target amount of coding per frame by reducing the frame rate;

a coding limit monitoring means which, based on the maximum coding amount per frame defined by the standard, monitors whether the amount of coding in the coding means exceeds the coding limit, every predetermined number of blocks, where the coding limit is set up for every predetermined number of blocks;

a coding interrupting means for interrupting the coding of the current frame when the present amount of coding exceeds the coding limit;

a quantization stepsize variational range checking means, which checks whether the input quantization stepsize falls within the specified range, and replaces the quantization stepsize with a closest value thereto falling within the specified range when the quantization stepsize falls out of the specified range, while uses the original quantization stepsize when the quantization stepsize falls within the specified range;

a quantization stepsize adding means which adds the quantization stepsize determined by the quantization stepsize variational range checking means;

an average quantization stepsize computing means for calculating the average value of the quantization stepsizes thus added;

an initial quantization stepsize computing means which computes the initial quantization stepsize based on the average quantization stepsize in the scene change frame and outputs the result to the quantization stepsize variational range checking means; and a quantization stepsize computing means which computes the quantization stepsize based on the target amount of coding, the information of the amount of coding not exceeding the coding limit and the average quantization stepsize for the previous frame and outputs the result to the quantization stepsize variational range checking means, wherein all the above means are activated when the post scene change mode information is input from the coding mode determining means.

In accordance with the fifth aspect of the invention, the moving picture coding apparatus having the above second feature is characterized in that the specific area enhancement coding control means comprises:

a target specific-area-enhancement coding amount computing means for calculating the target amount of coding per frame;

a target coding amount computing means for specific area allocation which, based on the information as to skip blocks from the block skip determining means, the information as to the specific area extracted by the specific area extracting means and the information as to the target amount of coding from the target specific-area-enhancement coding amount computing means, computes the amount of coding to be allotted for the specific area and that for other than the specific area;

a coding limit monitoring means which, based on the maximum coding amount per frame defined by the standard, monitors whether the amount of coding in the coding means exceeds the coding limit, every predetermined number of blocks, where the coding limit is set up for every predetermined number of blocks;

a coding interrupting means for interrupting the coding of the current frame when the present amount of coding exceeds the coding limit;

a quantization stepsize variational range checking means, which checks whether the input quantization stepsize falls within the specified range, and replaces the quantization stepsize with a closest value thereto falling within the specified range when the quantization stepsize falls out of the specified range, while uses the original quantization stepsize when the quantization stepsize falls within the specified range;

a quantization stepsize adding means which adds the quantization stepsize determined by the quantization stepsize variational range checking means;

an average quantization stepsize computing means for calculating the average value of the quantization stepsizes thus added;

an initial quantization stepsize computing means which computes the initial quantization stepsize based on the average quantization stepsize in the post-scene change mode and outputs the result to the quantization stepsize variational range checking means; and a quantization stepsize computing means which computes the quantization stepsize based on the target amount of coding, the information of the amount of coding not exceeding the coding limit, the information as to skip blocks from the block skip determining means, the specific area information from the specific area extracting means and the average quantization stepsize for the previous frame and outputs the result to the quantization stepsize variational range checking means, wherein all the above means are activated when the specific area mode information is input from the coding mode determining means.

In the present invention, the transform coefficients obtained by performing a two-dimensional orthogonal transform of the difference between the input picture and the motion compensated prediction value in each block are quantized and coded to generated coded information, which is output at a transmission rate matching the network. However, when a scene change frame occurs, the picture content of the frame is greatly different from that of the previous frame, so that the information from the previous frame cannot be used, which leads to sharp increase in the amount of coding, resulting in degradation of the picture quality. To deal with such a situation, the coding mode determining means discriminates the state after a scene change into three modes, i.e., the scene change frame mode, the post-scene change mode and the specific area mode. The coding control means controls quantization based on the mode thus determined. Illustratively, in the scene change frame mode and the post-scene change mode, the amount of coding per frame is increased by reducing the frame rate for the scene change frame and a predetermined number of frames downstream and quantized with a quantization stepsize without making any distinction as to the specific area to thereby improve the picture quality. Then, a large amount of coding is allotted to the specific area when the picture quality has become stabilized in the special area mode, to thereby improve the picture quality.

DESCRIPTION OF THE PREFERRED EMBODIMENTS

One embodiment of the invention will hereinafter be described with reference to the accompanying drawings.

Figure 1:
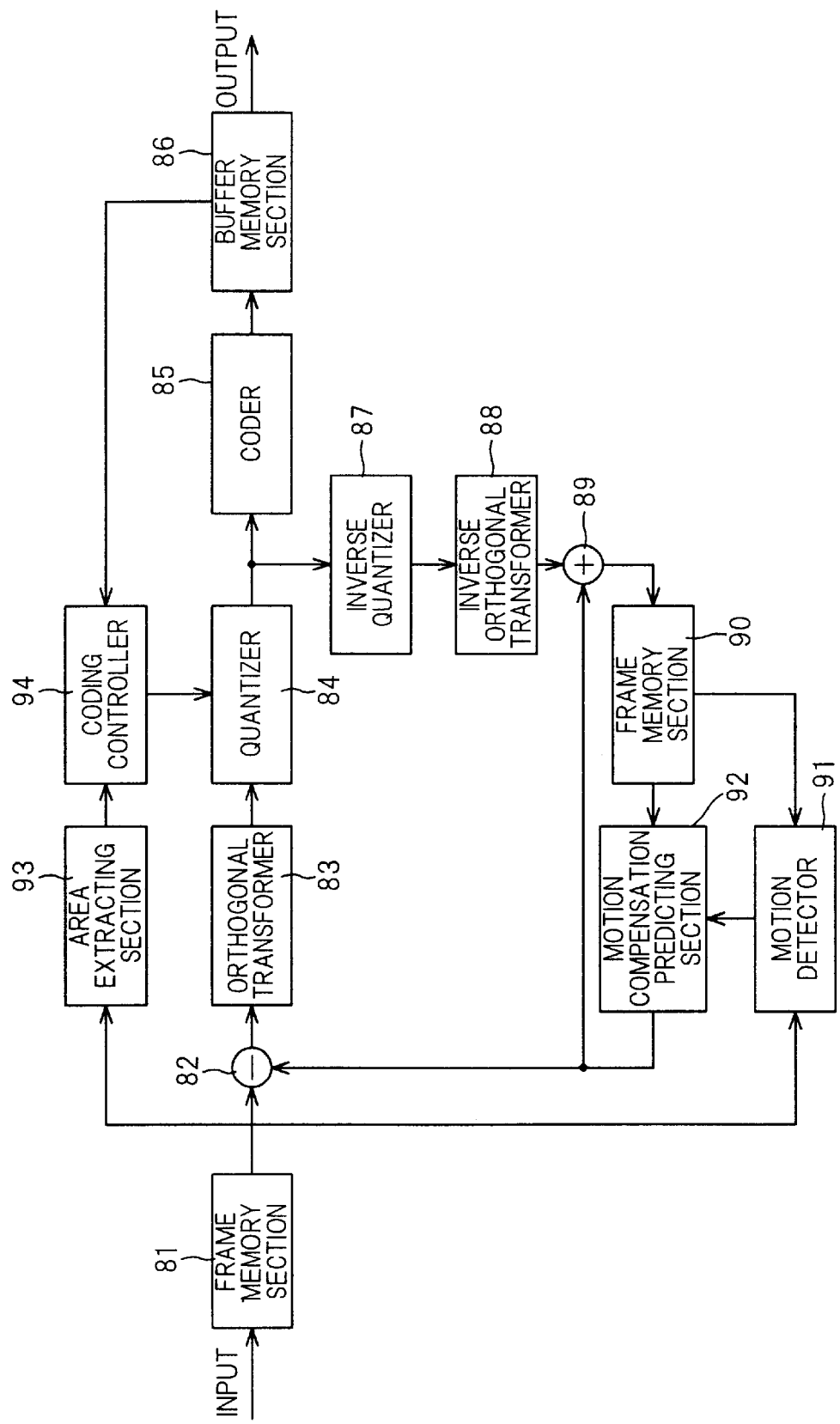
FIG. 1 is a block diagram showing an example of a conventional moving picture coding apparatus.
Figure 2:
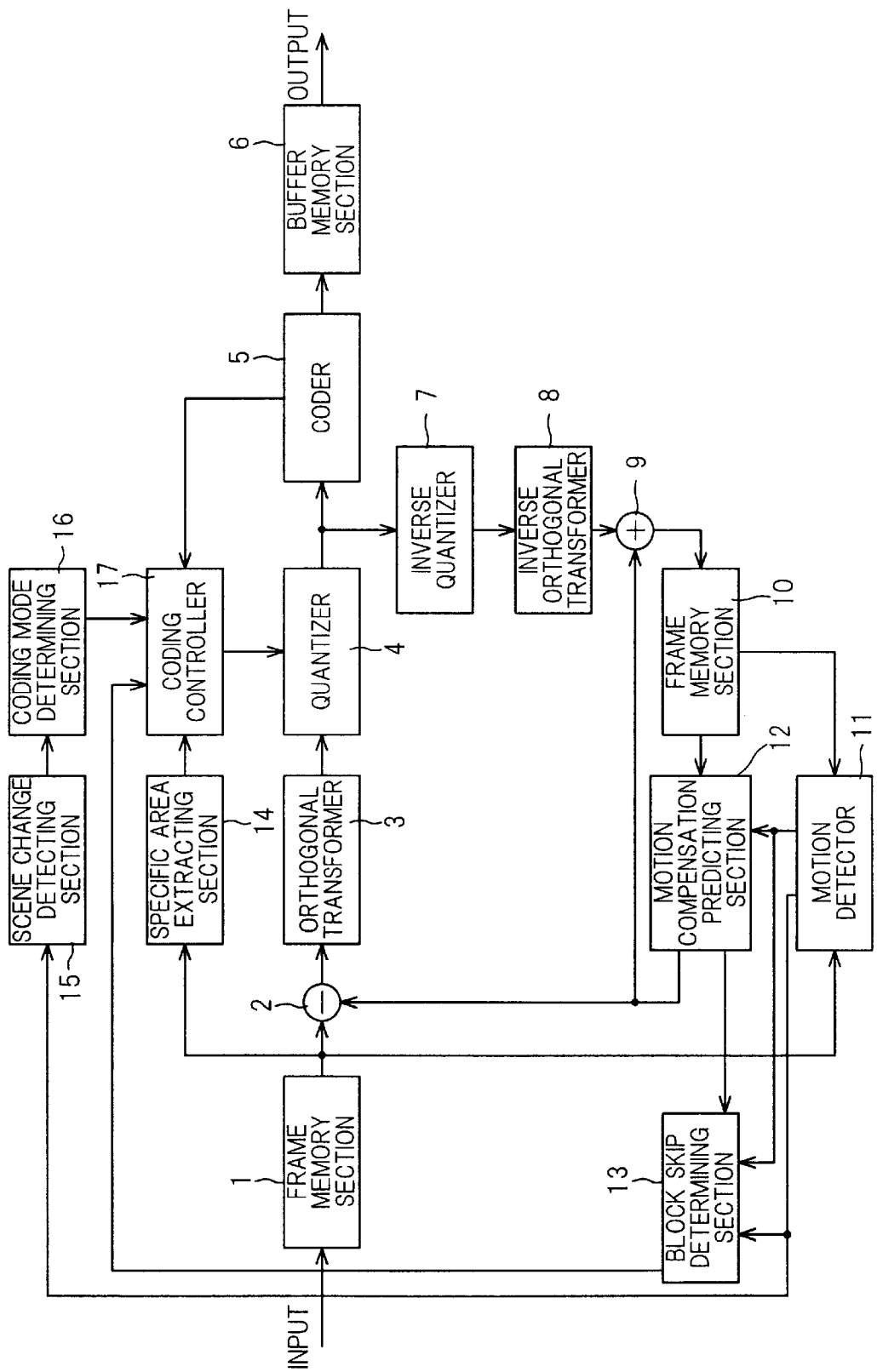
FIG. 2 is a block diagram showing one embodiment of a moving picture coding apparatus in accordance with the invention.

FIG. 2 is a block diagram showing one embodiment of a moving picture coding apparatus in accordance with the invention. This moving picture coding apparatus controls quantization and coding so as not to degrade the picture quality, taking into account the sharp increase in the amount of coding of the picture at a scene change, at which the current frame totally changes from the previous frame. That is, the operation is performed such that quantization and coding are controlled based on three stages, i.e., that immediately after the scene change, that from the scene change to stabilization of the picture quality, and that after the stabilization of the picture quality.

First, as shown in FIG. 2, this moving picture coding apparatus includes: a frame memory section 1, a subtracter 2; an orthogonal transformer 3; a quantizer 4; a coding section 5; a buffer memory section 6; an inverse quantizer 7; an inverse orthogonal transformer 8; an adder 9; a frame memory section 10; a motion detecting section 11; a motion compensation predicting section 12; a block skip determining section 13; a specific area extracting section 14; a scene change detecting section 15; a coding mode determining section 16; and a coding controlling section 17. The difference from the conventional moving picture coding apparatus is that this configuration has block skip determining section 13, scene change detecting section 15 and coding mode determining section 16.

The operation of the above moving picture coding apparatus is as follows:

Frame memory section 1 stores the input picture of a common format (CIF or QCIF) conforming to ITU-TH.261 standard, for example. Here, description will be made referring to an example of a QCIF input picture. In subtracter 2, the difference between the input picture stored in frame memory section 1 and the motion compensated prediction value computed by motion compensation predicting section 12 is subjected to, for example, a two-dimensional discrete cosine transform (DCT) for each block of 8×8 pixels, and the data signal is converted from the time domain to the frequency domain and the DCT coefficients are output to quantizer 4. Quantizer 4 performs quantization of the DCT coefficients based on the quantization stepsize which was determined by coding controlling section 17 in order to achieve a high efficiency of coding, to thereby reduce the DCT coefficients to be coded. The thus quantized DCT coefficients are supplied to coding section 5. In coding section 5, the DCT coefficients thus quantized are subjected to entropy coding so as to allot them with appropriate codes to produce coded information of variable length codes, which is then output.

Buffer memory section 6 stores the coded information generated from coding section 5 in order to make the system capacity match the transmission rate of the network and to output the coded information at a fixed rate. Inverse quantizer 7 performs inverse quantization which is a process opposite to that performed in quantizer 4, to output inverse quantized DCT coefficients to inverse orthogonal transformer 8. Inverse orthogonal transformer 8 performs a two-dimensional inverse discrete cosine transform. Then adder 9 sums up the image from inverse orthogonal transformer 8 and the motion compensated prediction values from motion compensation predicting section 12, and the result is stored in frame memory section 10.

In motion detecting section 11, the interframe difference between the image in frame memory section 10 and the picture in frame memory section 1 is determined for each macroblock as a unit, and motion vectors are detected based on the determined result and are output to motion compensation predicting section 12. The interframe difference for each macroblock is also supplied to block skip determining section 13 and scene change detecting section 15.

Motion compensation predicting section 12 determines motion compensated prediction values based on the picture in frame memory 10 and motion vectors from motion vector detecting section 11. Further, the power of the difference between the motion compensated prediction values and the input picture and the power of the input picture are compared to choose interframe prediction or intraframe prediction. This determined result is input to block skip determining section 13.

In block skip determining section 13, a map for improving the coding efficiency is prepared in a manner so that macroblocks having little difference from that of the previous frame are skipped and will not be coded. This is done as follows: when the x-component and y-component of the motion vector of a macroblock from motion detecting section 11 are both zero, the interframe difference is smaller than a predetermined value and if the determined result from motion compensation predicting section 12 is not that of intraframe prediction, the block is skipped so as not to be coded.

Specific area extracting section 14 extracts specific areas to be improved in picture quality. When, for example, the moving picture coding apparatus is applied to a video phone or video conference, the most significant area is the face area in general. Therefore, extracting the face area and enhancement of that area in picture quality provide improvement of subjective picture quality. For this reason, here, the face area is assumed to be the specific area, and the technique to extract the face area will be described. In this case, the area excepting the face area is assumed to be the background area.

Figure 3:
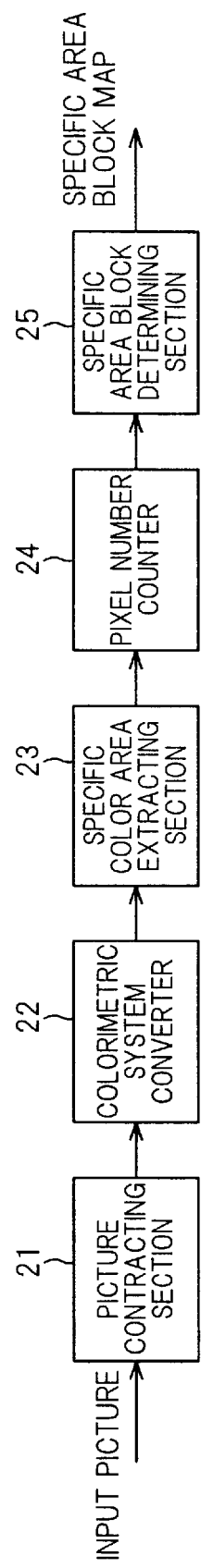
FIG. 3 is a block diagram showing the configuration of a specific area extracting section.

FIG. 3 is a block diagram showing the configuration of specific area extracting section 14. This specific area extracting section 14 includes a picture contracting section 21, a colorimetric system converter 22, a specific color area extracting section 23, a pixel number counter 24 and a specific area block determining section 25.

The thus configured specific area extracting section 14 operates as follows:

Picture contracting section 21 receives, Y, Cb and Cr components of the input picture stored in frame memory section 1 to create a contracted image having the predetermined size. Preparation of the contracted image makes it possible to shorten the subsequent processitime an ng d keep significant information while leaving out small variations as to luminance and color difference. Here, the Y-components of the input picture are averaged every 4×4 pixels and the data is reduced to $1/16$. The Cb-components and Cr-components of the input picture are averaged every 2×2 pixels and the data is reduced to $1/4$. Here, in the reduced picture, the size corresponding to the macroblock of the input picture is called unit block.

Colorimetric system converter 22 converts the contracted image from the YCbCr colorimetric system into the HSV colorimetric system. The HSV system is known as a perceptual calorimetric system which models more closely parallel human perception of colors. Since this system has less correlation between the components compared to the YCbCr colorimetric system which has high correlation between the components, this system is suitable for area division based on color.

The conversion formulas between the calorimetric systems are as follows. Conversion is performed by converting Y, Cb and Cr components into the RGB calorimetric system first, using formulae (1) to (3), then converting them into the HSV calorimetric system using formulae (4) to (6).

$$R=Y+1.4020Cr \quad (1)$$

$$G=Y-0.3441Cb-0.7139Cr \quad (2)$$

$$B=Y+1.7718Cb-0.012Cr \quad (3)$$

$$H=\cos^{-1}[\{(R-G)+(R-B)\}/2\sqrt{(R-G)^2+(R-B)(G-B)}] \quad (4)$$

$$S=\{\max(R,G,B)-\min(R,G,B)\}/V \quad (5)$$

$$V=\max(R,G,B) \quad (6)$$

In specific color area extracting section 23, to enable stable extraction of the face area, the face area is extracted based on the contracted image of the H component which, in the HSV colorimetric system, has the characteristic of being not readily affected by shading and/or shadows. The extraction is performed so that the following conditions are satisfied:

$$Th_{HL}<H_{ij}<Th_{HU} \quad (7)$$

where $H_{ij}$ is the pixel value of the H component image and $Th_{HL}$ and $Th_{HU}$ are the thresholds for extracting the face area.

Pixel number counter 24 counts the number of pixels, belonging to the face area determined by specific color area extraction section 23, in each unit block, and outputs the count result for each unit block to specific area block determining section 25. Specific area block determining section 25 compares the count result for each unit block from pixel number counting section 24 with the threshold for determining significant blocks and determines whether the count result is equal to or greater than the threshold. During this process, section 25 classifies a block equal to the threshold or greater as a significant block and a block less than the threshold as an insignificant block to produce a block map of one frame of the input picture and then outputs this map.

Here, the threshold for significant block determination is set up with reference to the target amount of coding for one frame. When the target amount of coding is small, the threshold is set high in order to extract more valid unit blocks, so that unit blocks having a lower count at pixel number counting section 24 are removed When the target amount of coding is large, the threshold is set low in order to perform exact transmission of fine image detail, so that unit blocks having lower count at pixel number counting section 24 can be extracted. In this way, the threshold for specific area block determination is previously set so that it will become smaller stepwise as the target amount of coding increases.

Figure 4:
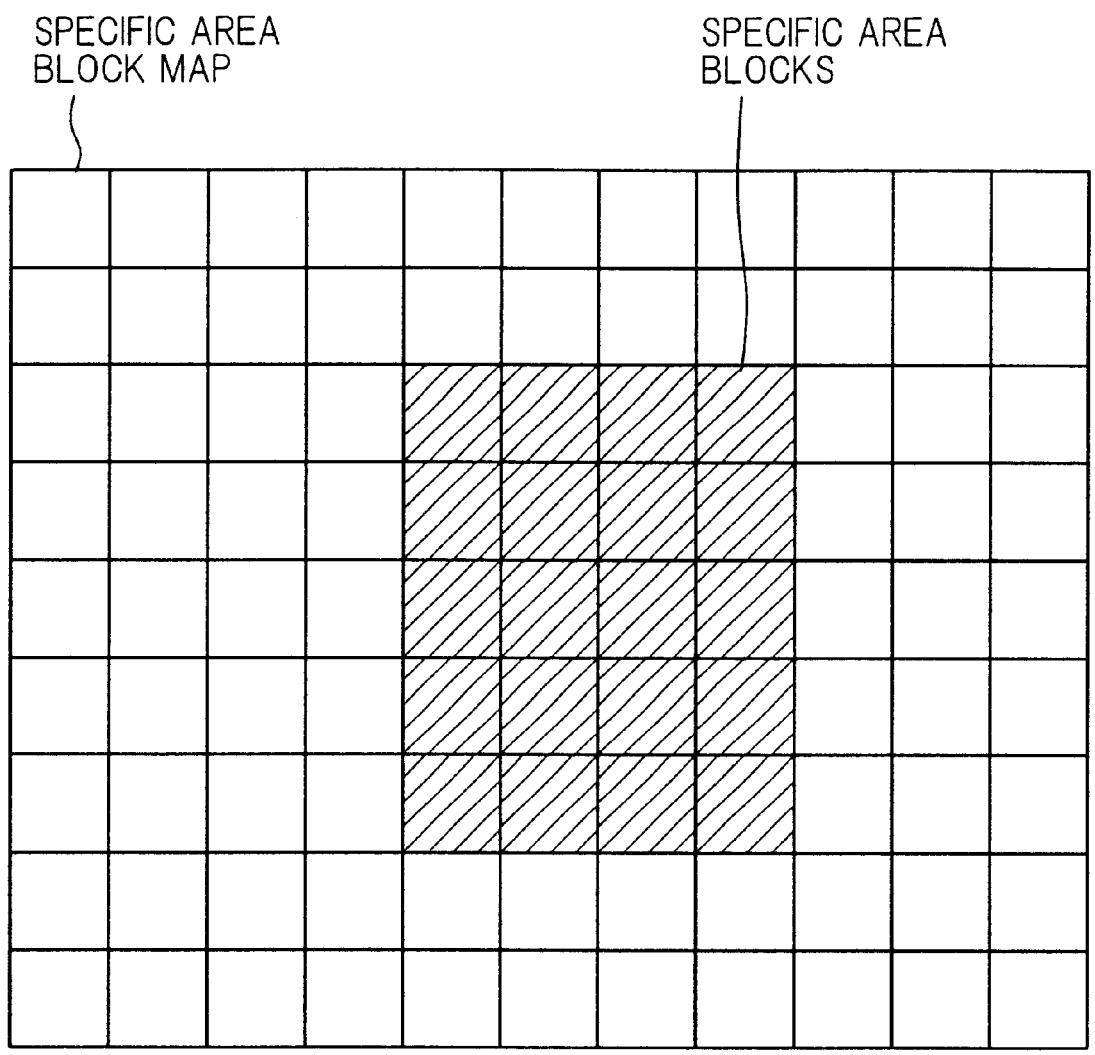
FIG. 4 is an illustrative diagram showing a specific area block map.

FIG. 4 shows the result of the specific area block determination with a certain threshold. Here, the hatched, specific area blocks are extracted and the map of one image frame of specific area blocks is termed a specific area block map. Since this embodiment is configured for QCIF, one block of the specific area block map corresponds; to one macroblock and is configured of 99 blocks.

Scene change detecting section 15 informs coding mode determining section 16 of the occurrence of a scene change when the following relation (8) is satisfied:

$$SAD_{sum}>Th_{SC} \quad (8),$$

where $SAD_{sum}$ is the sum of the interframe differences for individual macroblocks from motion detecting section 11 and $Th_{SC}$ is the threshold for scene change detection.

Coding mode determining section 16, when receiving the information as to the occurrence of a scene change from scene change detecting section 15, outputs a piece of mode information to coding control section 17. This mode control information is of three types of control information: the first for the scene change frame mode in which intraframe coding control is performed for the scene change frame; the second for the post-scene change mode in which scene change coding control is performed for a predetermined number of frames after the scene change in order to stabilize the quality of picture at an early stage; and the third for the specific area mode in which specific area enhancement coding control is performed in order to improve the picture quality of a specific area for frames downstream. Coding control section 17 controls quantizer 4, based on the mode control information, so that the current frame will have the predetermined amount of coding.

Figure 5:
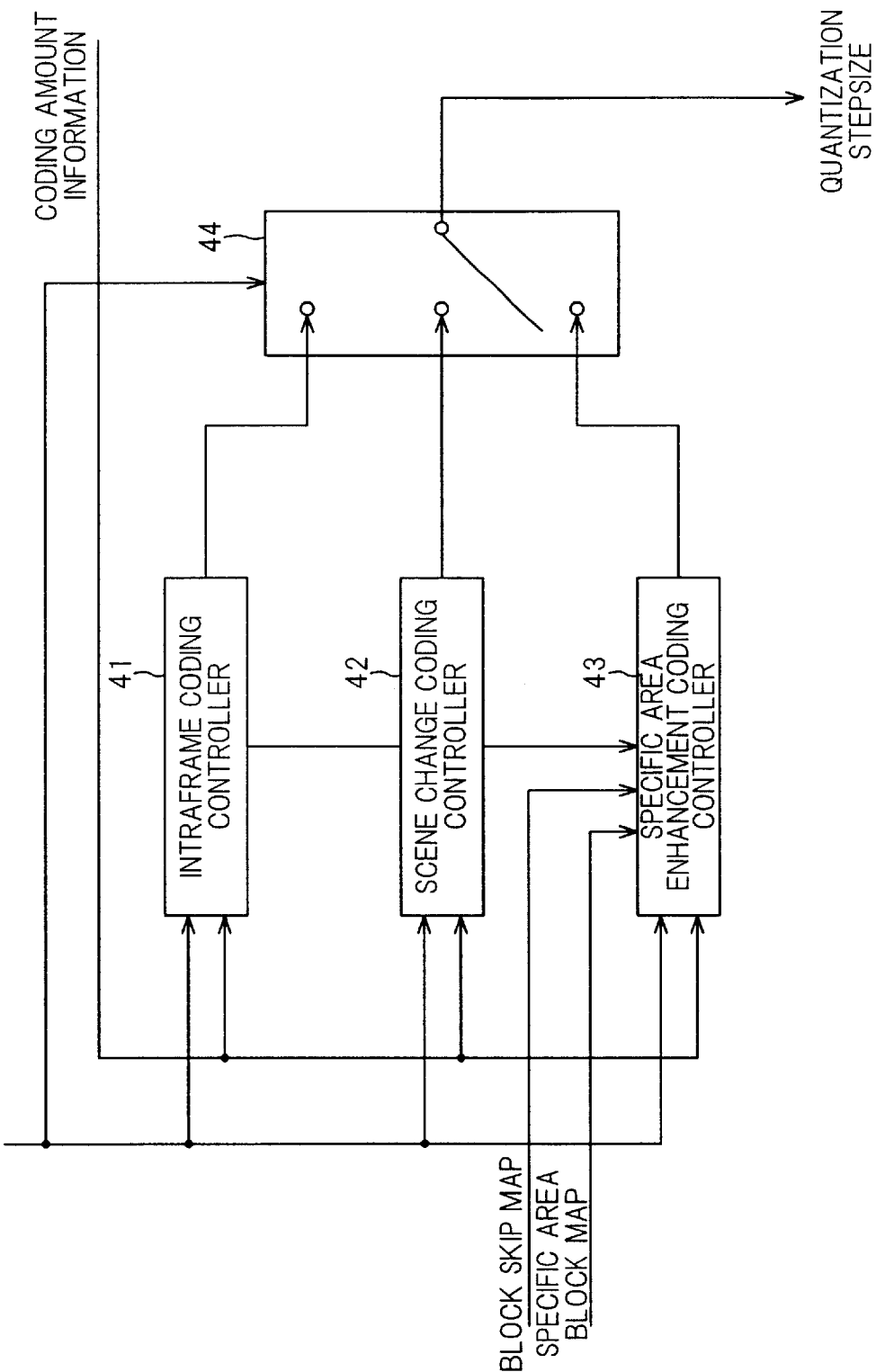
FIG. 5 is a block diagram showing the configuration of a coding control section.

FIG. 5 is a block diagram showing the configuration of coding control section 17. This coding control section 17 comprises: an intraframe coding control section 41; a scene change coding control section 42, a specific area enhancement coding control section 43 and a switching section 44.

Coding control section 17 having the above configuration operates as follows:

When coding control section 17 receives the control information for the scene change frame mode from coding mode determining section 16, and hence is instructed to effect intraframe coding control, intraframe coding control section 41 performs intraframe coding control on the current frame (the scene change frame) based on the information as to the amount of coding from coding section 5 (FIG. 2), and determines the quantization stepsize. Intraframe coding control section 41 outputs the average quantization stepsize to be used for coding control of the next frame to scene change coding control section 42. Switching section 44 performs switching so that the quantization stepsize, which was determined by intraframe coding control section 41 in accordance with the mode control information, is output to quantizer 4 (FIG. 2).

When the intraframe coding of one frame (the scene change frame) has been completed, coding control section 17 receives the control information for the post-scene change frame mode, hence scene change coding control section 42 performs scene change coding control on the current frame based on the information as to the coding amount from coding section 5 (FIG. 2), and determines the quantization stepsize. During scene change coding control, the picture quality is enhanced by thinning frames whilst not making any distinction between the specific area and other than the specific area. Scene change coding control section 42 outputs the average quantization stepsize to be used for coding control of the next frame to specific area enhancement coding controlling section 43. Switching section 44 performs switching so that the quantization stepsize, which was determined by scene change coding control section 42 in accordance with the mode control information, is output to quantizer 4 (FIG. 2).

When scene change coding for the pre determined number of frames has been finished, coding control section 17 receives the control information for the specific area mode, hence specific area enhancement coding control section 43 performs specific area enhancement coding control on the current frame based on the information as to the coding amount from coding section 5 (FIG. 2), the block skip map from block skip determining section 13 (FIG. 2) and the specific area block map from specific area extracting Section 14 (FIG. 2), and determines the quantization stepsize. Switching section 44 performs switching so that the quantization stepsize, which was determined by specific area enhancement coding control section 43 in accordance with the mode control information, is output to quantizer 4 (FIG. 2).

Figure 6:
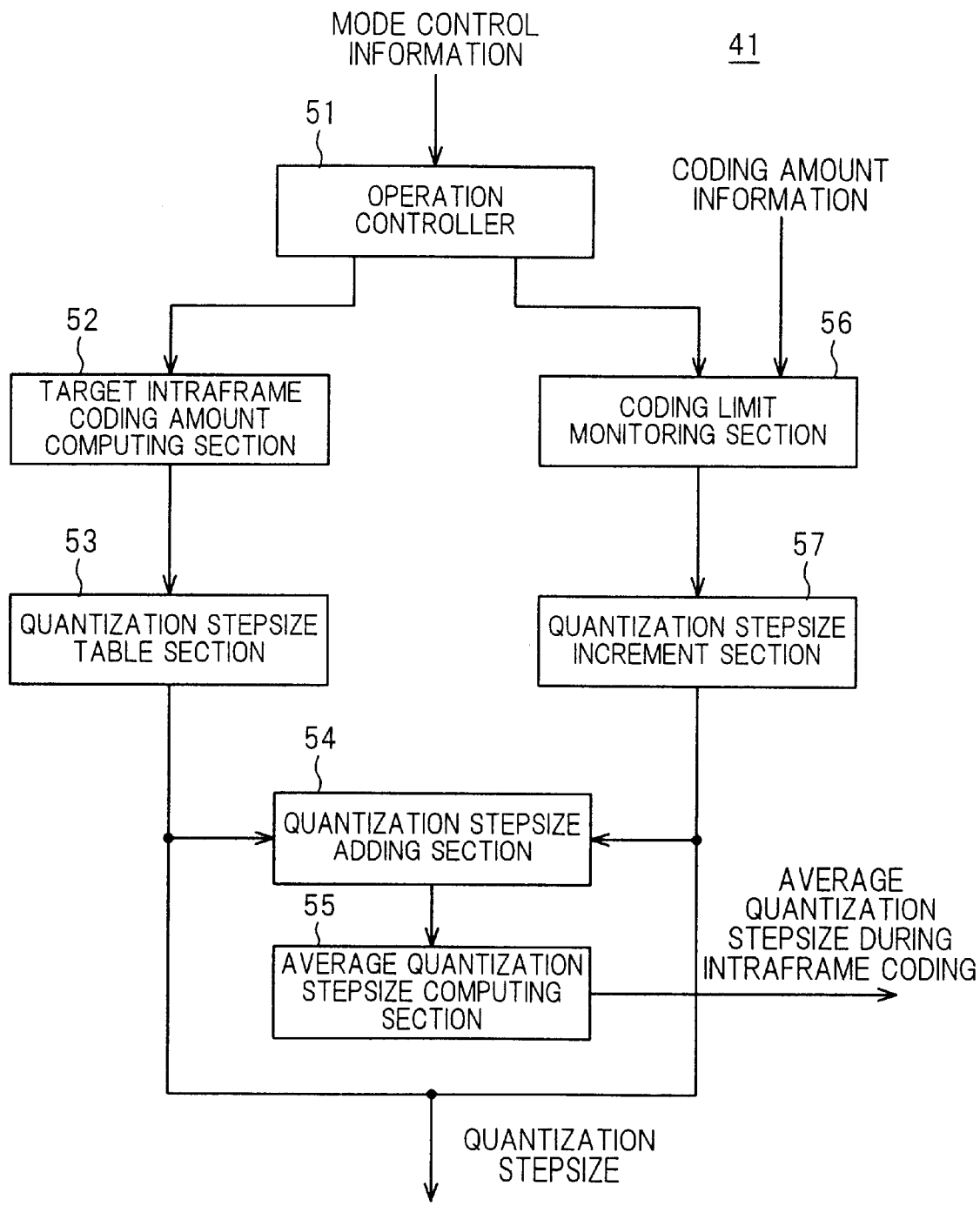
FIG. 6 is a block diagram showing the configuration of an intraframe coding control section.

FIG. 6 is a block diagram showing the configuration of the aforementioned intraframe coding control section 41. This intraframe coding control section 41 comprises an operation control section 51, a target intraframe-coding amount computing section 52, a quantization stepsize table section 53; a quantization stepsize adding section 54, an average quantization stepsize computing section 55, a coding limit monitoring section 56 and a quantization stepsize increment section 57.

Intraframe coding control section 41 having the above configuration operates as follows:

Operation control section 51, based on the input mode control information (of the scene change frame mode), controls the determining operation of the quantization stepsize for the macroblocks in one frame (the scene change frame). In this embodiment, in view of reducing the processing amount, one quantization stepsize is determined every eleven macroblocks (the number of the macroblocks in one row in FIG. 4), but the present method can be applied to determination of quantization stepsize for an arbitrary number of macroblocks. Specifically, quantization stepsize may be determined at intervals of an arbitrary period, every macroblock or every 33 macroblocks, for example.

First, in order to compute the target coding amount per frame for the current frame, operation control section 51 activates target intraframe-coding amount computing section 52, at the beginning of each frame. Here, the target intraframe coding amount, $InitB_{target}$ is computed by following equation (9).

$$InitB_{target} = R / \{f_{target}/f_{factor}\} \qquad (9),$$

where R is the image transmission rate, $f_{target}$ is the target frame rate and $f_{factor}$ is a value greater than 1. By the division of $f_{target}$ by $f_{factor}$, the resultant frame rate becomes smaller than the target frame rate. Since the transmission rate is a fixed value, the target coding amount per frame is increased by frame thinning, thus making it possible to mitigate block distortion and/or mosquito noise even when intraframe coding, which needs a large amount of coding, is performed.

In quantization stepsize table section 53, in accordance with $InitB_{target}$ one appropriate quantization stepsize $QP_{intra}$ is selected from the table in which quantization stepsizes are previously defined in relation to coding amounts, and the selected quantization stepsize is output to be used for the quantization of eleven macroblocks. The reason for using quantization stepsize table section 53 is that the scene change frame cannot refer to the quantization stepsize of the previous frame, so it is necessary to previously set up the relationship between $InitB_{target}$ and quantization stepsize. This quantization stepsize is also input to quantization stepsize adding section 54 where the used quantization stepsizes are added up in order to determine the average quantization stepsize in one frame.

After the completion of quantization of the first eleven macroblocks, operation control section 51 gives instructions to determine the quantization stepsize for the next eleven macroblocks and downstream. First, the coding amount information $B_{i'mb}$ representing the present coding amount of the current frame is input from coding section 5 to coding limit monitoring section 56, where it is checked by the following relation whether the input exceeds the present coding limit $B_{max'mb}$. Here, coding limit $B_{max'mb}$ is determined every eleven macroblocks, in order to avoid the coding amount for one frame exceeding the maximum coding amount per frame, conforming to the H.261 standard. That is, the maximum coding amount of the standard is divided for eleven macroblocks and then the quotient is accumulated to determine the coding limit $B_{max'mb}$.

$$B_{i'mb} > B_{max'mb} \qquad (10)$$

When the relation (10) is satisfied, it means that the current coding amount surpasses the coding limit. Therefore, the quantization stepsize used for the previous eleven macroblocks is increased as follows:

$$QP_{intra} = QP_{intra} + 1 \qquad (11).$$

Here, from equation (11), the quantization stepsize is increased by only one, but the increment may be greater than one. In this way, when the current coding amount surpasses the coding limit, the coding amount for the next eleven macroblocks can be reduced by increasing the quantization stepsize, thus absolutely avoiding the coding amount of one frame exceeding the maximum coding amount of the standard.

This quantization stepsize is output to switching section 44 to perform quantization of the next eleven macroblocks and also supplied to quantiization stepsize adding section 54 in the same manner as above. This process, i.e., the process for eleven macroblocks as a unit, is repeated throughout all the macroblocks in the current frame. Then, when the last eleven macroblocks have been quantized, the average value of the quantization stepsizes used in the current frame is calculated by average quantization stepsize computing section 55 and is output to scene change coding control section 42 (FIG. 5).

Figure 7:
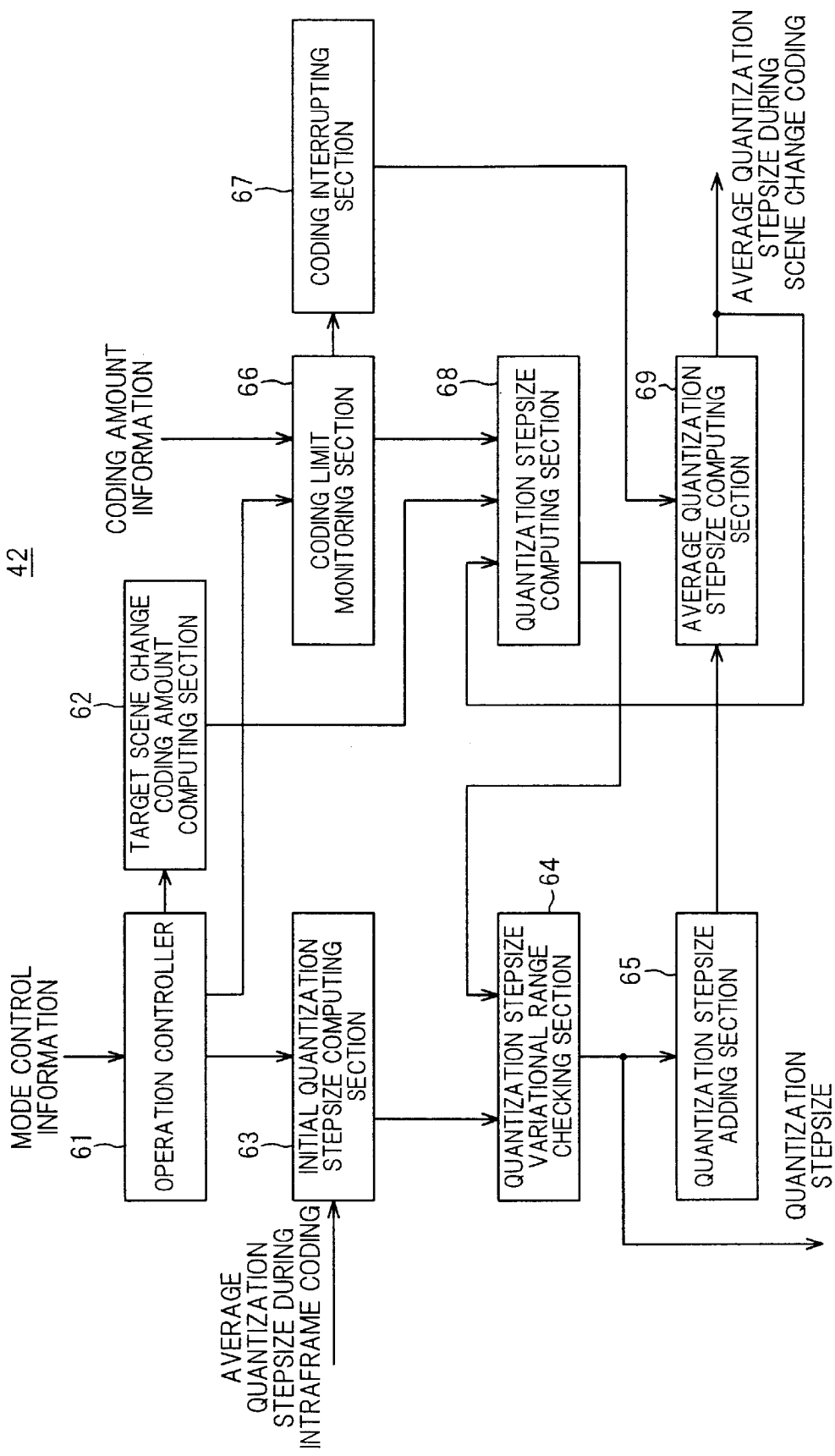
FIG. 7 is a block diagram showing the configuration of a scene change coding control section.

FIG. 7 is a block diagram showing the configuration of scene change coding control section 42. Scene change coding control section 42 comprises an operation control section 61, a target scene-change coding amount computing section 62, an initial quantization stepsize computing section 63, a quantization stepsize variational range checking section 64, a quantization stepsize adding section 65, a coding limit monitoring section 66, a coding interrupting section 67, a quantization stepsize computing section 68 and an average quantization stepsize computing section 69.

Scene change coding control section 42 thus configured operates as follows:

Operation control section 61, based on the input mode control information (of the post-scene change mode), controls the determining operation of the quantization stepsize for the subsequent macroblocks. In this embodiment, from the same viewpoint as above of reducing the processing amount, one quantization stepsize is determined every eleven macroblocks, but the present method can be applied to determination of quantization stepsize for an arbitrary number of macroblocks. Specifically, quantization stepsize may be determined at intervals of an arbitrary period, every macroblock or every 33 macroblocks, for example.

First, in order to compute the target coding amount per frame for the current frame, operation control section 61 activates target scene-change coding amount computing section 62, at the beginning of each frame. Here, the target scene-change coding amount, $ScB_{target}$ is computed by following equation (12).

$$ScB_{target} = R/\{f_{target}/f_{factor}\} \quad (12),$$

where R is the image transmission rate, $f_{target}$ is the target frame rate and $f_{factor}$ is a value greater than 1. By the division of $f_{target}$ by $f_{factor}$, the resultant frame rate becomes smaller than the target frame rate. However, the target coding amount per frame becomes greater, thus making it possible to mitigate block distortion and/or mosquito noise even when scene change coding which needs a large amount of coding is performed.

Operation control section 61 also activates initial quantization stepsize computing section 63, at the beginning of each frame, in order to compute the quantization stepsize of the initial macroblock of each frame. Here, average quantization stepsize $IntraAveQP_{i-1}$ at the time of intraframe coding of the previous frame is used to compute quantization stepsize $QP_{new}$ by the following equation (13):

$$QP_{new} = IntraAveQP_{i-1} * 0.5 \quad (13).$$

For the use in quantization stepsize computing section 68, average quantization stepsize $ScAveQP_{i-1}$ is determined by the following equation (14):

$$ScAveQP_{i-1} = QP_{new} \quad (14).$$

Quantization stepsize variational range checking section 64 checks whether the quantization stepsize determined by initial quantization stepsize computing section 63 or quantization stepsize computing section 68 falls within the range between the predetermined minimum $QP_{min}$ and the predetermined maximum $QP_{max}$, based on the following relations (15) and (16). When the relation is satisfied, $QP_{new}$ is replaced by $QP_{min}$ or $QP_{max}$. This procedure is capable of maintaining the picture quality within a uniform range.

$$\text{When } QP_{new} < QP_{min}, \text{ then } QP_{new} = QP_{min} \quad (15),$$

$$\text{when } QP_{new} > QP_{max}, \text{ then } QP_{new} = QP_{max} \quad (16).$$

The quantization stepsize checked by quantization stepsize variational range checking section 64 is output to switching section 44 (FIG. 5) to quantize eleven macroblocks. This quantization stepsize is also output to quantization stepsize adding section 65, where the used quantization stepsizes are added up in order to determine the average quantization stepsize in one frame.

After the completion of quantization of every eleven macroblocks, operation control section 61 activates coding limit monitoring section 66. Coding limit monitoring section 66 receives the coding amount information representing the present coding amount of the current frame from coding section 5 (FIG. 2) and acquires the amount of coded information (coding amount $B_{i,mb}$) up to the current macroblock in the current frame so as to check, based on the aforementioned relation (10), whether the input exceeds the present coding limit $B_{max,mb}$. When the relation (10) is satisfied, it means that the current coding amount surpasses the coding limit. Therefore, the coding amount cannot be increased above its present amount. At this moment, coding interrupting section 67 stops the quantization of the remaining macroblocks in the current frame while average quantization stepsize computing section, 69 computes the present average quantization stepsize and outputs it. Since macroblocks downstream will not be coded, the picture of the previous frame will be used.

Quantization stepsize computing section 68 is activated when coding limit monitoring section 66 has determined that the current coding amount is not greater than the coding limit. This section operates so that when the current coding amount is greater than the target coding amount $ScB_{target}$ taking into account the current position of coding, the quantization stepsize for the next eleven macroblocks is increased; and when the current coding amount is smaller than the target coding amount $ScB_{target}$ taking into account the current position of coding, the quantization stepsize for the next eleven macroblocks is decreased. More explicitly, the quantization stepsize for the next eleven macroblocks $QP_{new}$ is calculated by the following formula (17):

$$QP_{new} = ScAve\ QP_{i-1} * [\{(B_{i,mb}*(MB/mb) + B_{i-1} - B_{target}\}/B_{target}] \quad (17),$$

where MB is the number of macroblocks in one frame (396 blocks for CIF, 99 blocks for QCIF), mb is the number of the present coded macroblocks in the current frame and $B_{i-1}$ is the coding amount of the previous frame obtained from the information as to the coding amount.

As $QP_{new}$ is input to quantization stepsize variational range checking section 64, it is checked whether $QP_{new}$ is within the predetermined range, following the aforementioned method. $QP_{new}$ is then supplied to switching section 44 (FIG. 5) and quantization stepsize adding section 65.

This procedure for every eleven macroblocks is performed for all the macroblocks in the current frame. When the last eleven macroblocks have been quantized, or when the coding is interrupted, the quantization stepsizes used in the current frame are averaged to renew $ScAve\ QP_{i-1}$. $ScAve\ QP_{i-1}$ is also output to specific area enhancement coding control section 43 (FIG. 5) for subsequent processes.

Figure 8:
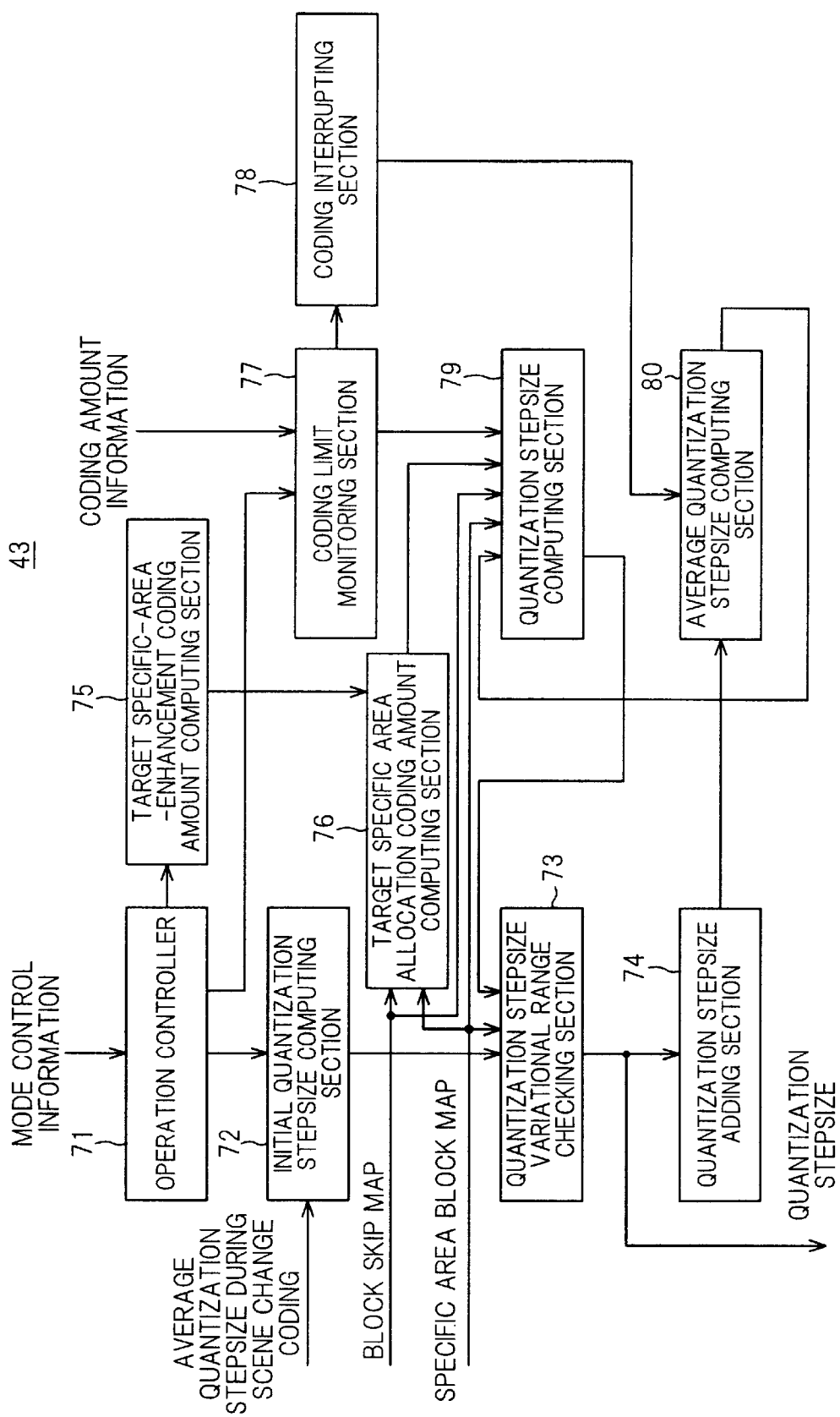
FIG. 8 is a block diagram showing the configuration of a specific area enhancement coding control section.

FIG. 8 is a block diagram showing the configuration of specific area enhancement coding control section 43. Specific area enhancement coding control section 43 comprises an operation control section 71, an initial quantization stepsize computing section 72, a quantization stepsize variational range checking section 73, a quantization stepsize adding section 74, a target specific-area-enhancement coding amount computing section 75, a specific area allocation coding amount computing section 76, a coding limit monitoring section 77, a coding interrupting section 78, a quantization stepsize computing section 79 and an average quantization stepsize computing section 80.

Specific area enhancement coding control section 43 thus configured operates as follows:

Operation control section 71, based on the input mode control information (of the specific area mode), controls the determining operation of the quantization stepsize for the subsequent macroblocks. In this embodiment, from the same viewpoint as above of reducing the processing amount, one quantization stepsize is determined every eleven macroblocks, but the present method can be applied to determination of quantization stepsize for an arbitrary number of macroblocks. Specifically, quantization stepsize may be determined at intervals of an arbitrary period, every macroblock or every 33 macroblocks, for example.

For controlling the first frame to be subjected to specific area enhancement coding control after the switching from scene change coding control, operation control section 71 activates initial quantization stepsize computing section 72 in order to compute the quantization stepsize of the first macroblock in the frame. Here, the average quantization stepsize $ScAveQP_{i-1}$ calculated from the last frame of the previous frame in the scene change coding mode is used to determine quantization stepsizes $FaceQP_{new}$ and $NonFaceQP_{new}$ for the face area and the background area, respectively, using the following relations (18) and (19):

$$FaceQP_{new}=ScAveQ_{i-1} \qquad (18)$$

$$NonFaceQP_{new}=ScAveQ_{i-1}. \qquad (19)$$

Since the last frame in the scene change coding mode had only one quantization stepsize without distinction between the face area and the background area, the quantization stepsizes $FaceQP_{new}$ and $NonFaceQP_{new}$ have the same value.

Quantization stepsize variational range checking section 73 checks whether the quantization stepsizes for the face area and background area, determined by initial quantization stepsize computing section 72 or quantization stepsize computing section 79, fall within the respective ranges: between the predetermined minimum $FaceQP_{min}$ and the predetermined maximum $FaceQP_{max}$, based on the following relations (20) and (21); and between the predetermined minimum $NonFaceQP_{min}$ and the predetermined maximum $NonFaceQP_{max}$, based on the following relations (22) and (23). When the relation is satisfied, $FaceQP_{new}$ is replaced by $FaceQP_{min}$ or $FaceQP_{max}$, or $NonFaceQP_{new}$ is replaced by $NonFaceQP_{min}$ or $NonFaceQP_{max}$. This procedure is able to maintain the picture quality within a uniform range.

When $FaceQP_{new} < FaceQP_{min}$, then $FaceQP_{new} = FaceQP_{min}$ (20), when $FaceQP_{new} > FaceQP_{max}$, then $FaceQP_{new} = FaceQP_{max}$ (21), when $NonFaceQP_{new} < NonFaceQP_{min}$, then $NonFaceQP_{new} = NonFaceQP_{min}$ (22), when $NonFaceQP_{new} > NonFaceQP_{max}$, then $NonFaceQP_{new} = NonFaceQP_{max}$ (23).

The quantization stepsizes thus checked are output to quantize eleven macroblocks. Based on the specific area block map from specific area extracting-section 14 (FIG. 2), if the macroblocks to be quantized are in the face area, $FaceQP_{new}$ is selected, and if the macroblocks to be quantized are in the background area, $NonFaceQP_{new}$ is selected. This quantization stepsize is also supplied to quantization stepsize adding section 74, where the used quantization stepsizes are added up in order to determine the average quantization stepsizes for the face area and background area in one frame.

Further, in order to compute the target coding amount per frame for the current frame, operation control section 71 activates target specific-area-enhancement coding amount computing section 75, at the beginning of each frame. Here, the target coding amount for specific area enhancement coding, $B_{target}$ is computed by following equation (24):

$$B_{target}=R/f_{target} \qquad (24).$$

Target specific area allocation coding amount computing section 76, based on the specific area block map and the block skip map, computes the target coding amounts per macroblock for the face area and the background area. First, from the specific area block map, the number of macroblocks FaceMB belonging to the face area is determined. The number of macroblocks belonging to the background area is NonFaceMB. Then, the number of coded macroblocks belonging to the face area (CodedFaceMB), the number of skipped macroblocks belonging to the face area (NotCodedFaceMB), the number of coded macroblocks belonging to the background area (CodedNonFaceMB), and the number of skipped macroblocks belonging to the background area (NotCodedNonFaceMB) are determined using the block skip map. From these values, FaceAssignFactor and NonFaceAssignFactor, which represent in what proportion the codes are allotted to the face and the background areas, are computed in the following manner:

when FaceAssignFactor<1.2, then FaceAssignFactor=1.0, when 1.2≦FaceAssignFactor<5.0, then FaceAssignFactor=(FaceAssignFactor−1.0)*0.5+1.0, and when FaceAssignFactor≧5.0, then FaceAssignFactor=3.0. (25)

where

FaceAssignFactor=(MB−NotCodedFaceMB−NotCodedNon-
FaceMB)/CodedFaceMB, NonFaceAssignFactor=(MB−NotCod-
edFaceMB−NotCodedNonFaceMBFaceMB*FaceAssignFactor)/
CodedNonFaceMB (26).

Further, the target coding amounts per macroblock for the face area and the background area, designated by FaceBit and NonFaceBit, are determined as follows:

FaceBit=R*FaceAssignFactor/{$f_{target}$*(MB−NotCodedFaceMB−
NotCodedNonFaceMB)} (27)

NonFaceBit=R*NonFaceAssignFactor/{$f_{target}$*(MB−NotCoded-
FaceMB−NotCodedNonFaceMB)} (28).

After the completion of quantization of every eleven macroblocks, operation control section 71 activates coding limit monitoring section 77. Coding limit monitoring section 77 receives the coding amount information representing the present coding amount of the current frame from coding section 5 (FIG. 2) and acquires the amount of coded information (coding amount $B_{i'mb}$) up to the current macroblock in the current frame so as to check, biased on the aforementioned relation (10), whether the input exceeds present coding limit $B_{max'mb}$. When the relation (10) is satisfied, it means that the current coding amount surpasses the coding limit. Therefore, the coding amount cannot be increased above its present amount. At this moment, coding interrupting section 78 stops the quantization of the remaining macroblocks in the current frame while average quantization stepsize computing section 80 computes the present average quantization stepsize and outputs it. Since macroblocks downstream will not be coded, the picture of the previous frame will be used.

Quantization stepsize computing section 79 is activated when coding limit monitoring section 77 has determined that the current coding amount is not greater than the coding limit. This section operates based on the specific area block map and the block skip map so that when the current coding amount is greater than the target coding amount $B_{target}$ taking into account the current position of coding, the quantization stepsize for the next eleven macroblocks is increased; and when the current coding amount is smaller than the target coding amount $B_{target}$ taking into account the current position of coding, the quantization stepsize is decreased. More explicitly, the quantization stepsize for the next eleven macroblocks NonFaceQP$_{new}$ is calculated by the following formula (29):

$$\text{NonFaceQP}_{new} = \text{AveNonFaceQP}_{new} *(1.0+\text{NonFaceQP}_{factor}), \text{NonFaceQP}_{factor} = 2.0*\{B_{i'mb}-(\text{FaceBit}*\text{codedfacemb}+\text{NonFaceBit}*\text{codednonfacemb})*(\text{MB}-\text{NotCodedFaceMB}-\text{NotCodedNonFaceMB})\}/\{B_{target}*(\text{codedfacemb}+\text{codednonfacemb})\} \quad (29),$$

where MB is the number of macroblocks in one frame (396 blocks for CIF, 99 blocks for QCIF), codedfacemb is the number of the present coded macroblocks belonging to the face area in the current frame, codednonfacemb is the number of the present coded macroblocks belonging to the background area in the current frame, and $B_{i-1}$ is the coding amount of the previous frame obtained from the information as to the coding amount.

Depending upon NonFaceQP$_{new}$, quantization stepsize FaceQP$_{new}$ for the macroblocks belonging to the face area contained in the next eleven macroblocks is renewed in following two conditions:

$$\text{NonFaceQP}_{new} \leq \text{NonFaceQP}_{min} \quad (30)$$

$$\text{NonFaceQP}_{new} \geq \text{NonFaceQP}_{max} \quad (31).$$

When relation (30) is satisfied, the current coding amount is lower than the target coding amount. Therefore, a smaller quantization stepsize can be used. Accordingly, FaceQP$_{new}$ is modified as follows:

$$\text{FaceQP}_{new} = \text{FaceQP}_{new} - 1 \quad (32).$$

In contrast, when relation (31) is satisfied, the amount of the generated codes exceeds the target coding amount. Therefore, it is necessary to reduce the coding amount. Accordingly, Face QP$_{new}$ is modified as follows:

$$\text{FaceQP}_{new} = \text{FaceQP}_{new} + 1 \quad (33).$$

FaceQP$_{new}$ and NonFaceQP$_{new}$ are input to quantization stepsize variational range checking section 73, and then it is checked whether the quantization stepsizes are within the predetermined ranges, following the aforementioned method. FaceQP$_{new}$ and NonFaceQP$_{new}$ are then supplied to switching section 44 (FIG. 5) and quantization stepsize adding section 74.

This procedure for every eleven macroblocks is performed for all the macroblocks in the current frame. When the last eleven macroblocks have been quantized, or when the coding interrupted, the quantization stepsizes used in the current frame are averaged to renew quantization stepsizes FaceAveQP$_{i-1}$ and NonFaceAveQP$_{i-1}$. These are then output to quantization stepsize computing section 80 to compute the quantization stepsizes for the next frame.

In the above way, a greater amount of coding is allotted to the macroblocks representing the face area than those for the background area, so that it is possible to improve the picture quality of the face area.

As has been obvious from the above description, the apparatus of the invention has a coding control means, which, based on the mode determined by the coding mode determining means, sets up the quantization stepsize for the scene change frame and a predetermined number of frames downstream, for the quantizing means by reducing the frame rate without differentiating the specific area from the others, and sets up the quantization stepsize for the frames after the predetermined number of frames, for the quantizing means which restores the frame rate and increases the amount of coding for the specific area. Accordingly, when the picture quality is unstable immediately after a scene change, coding control is performed with importance put on the total picture quality while sacrificing the motion in the picture; and after the picture quality has been stabilized, coding control is performed so as to improve the picture quality of the specific area. Therefore, it is possible to suppress degradation of the picture quality producing less noise and distortion even at a fixed transmission rate.

What is claimed is:

1. A moving picture coding apparatus comprising:

a motion detecting means for detecting motion vectors by dividing the input picture into blocks of N×M pixels (N and M are natural numbers) and determining the interframe difference for each block between the current frame and the previous frame;

a motion compensation predicting means for determining motion compensated prediction values from the motion vectors to select interframe prediction or interframe prediction;

an orthogonal transforming means for obtaining transform coefficients by performing an orthogonal transform of the difference between the input picture and the motion compensated prediction values;

a quantizing means for quantizing the transform coefficients;

a coding means for coding the quantized transform coefficients to generate coded information;

a block skip determining means for determining blocks to skipped without coding, based on the interframe difference, determined by the motion detecting means, between the current frame and the previous frame and based on the determined result of the motion compensated prediction obtained from the motion compensation predicting means;

a specific area extracting means for extracting specific area from the input picture;

a scene change detecting means for detecting a scene change based on the interframe difference;

a coding mode determining means which, when the scene change detecting means has detected a scene change, determines which mode the current state is in among three modes, the scene change frame mode for coding the scene change frame, the post-scene change mode for coding a predetermined number of frames after the occurrence of the scene change, and the specific area mode in which frames downstream are coded to improve the quality of picture of the specific area which has been extracted by the specific area extracting means; and a coding control means which, based on the mode determined by the coding mode determining means, controls the quantization in a manner such that a scene change frame and a predetermined number of frames downstream are quantized by setting up a quantization stepsize at the quantizing means and by using the quantization stepsize which allows no discrimination between the specific area and the area other than the specific area whilst thinning frames; and frames after the predetermined number of frames are quantized setting up a quantization stepsize at the quantizing means for increasing the coding amount of the specific area whilst restoring the original frame rate, wherein the coded information is transmitted at a predetermined frame rate by making the system capacity match the transmission rate of the network.

2. The moving picture coding apparatus according to claim 1, wherein the coding control means comprises:

an intraframe coding control means which, in the scene change frame mode, increases the amount of coding per frame by reducing the frame rate and sets up a quantization stepsize based on which the scene change frame is coded by intraframe coding without making any distinction as to the specific area;

a scene change coding control means which, in the post-scene change mode, increases the amount of coding per frame by reducing the frame rate and sets up a quantization stepsize based on which a predetermined number of frames after a scene change are coded using the information of the previous frame without making any distinction as to the specific area;

a specific area enhancement coding control means, which in the specific area mode, sets up a quantization stepsize in accordance with the coding amount information from the coding means, to perform coding based on the information as to skip blocks obtained from the block skip determining means and based on the information as to the specific area extracted by the specific area extracting means; and a switching means for selecting one of the three control signals based on the mode information from the coding mode determining means.

3. The moving picture coding apparatus according to claim 2, wherein the intraframe coding control means comprises:

a target intraframe-coding amount computing means for calculating the target coding amount of a scene change frame with the frame rate reduced;

a quantization stepsize setting means, which sets up a quantization stepsize based on the target coding amount, using the previously prepared relationship between target coding amounts and quantization stepsizes;

a coding limit monitoring means which, based on the maximum coding amount per frame defined by the standard, monitors whether the amount of coding in the coding means exceeds the coding limit, every predetermined number of blocks, where the coding limit is set up for every predetermined number of blocks;

a quantization stepsize increment means for increasing the quantization stepsize when the amount of coding in the coding means exceeds the coding limit;

a quantization stepsize adding means which adds the quantization stepsize determined by the quantization stepsize setting means and the quantization stepsize which has been increased by the quantization stepsize increment means; and an average quantization stepsize computing means for calculating the average value of the quantization stepsizes thus added, wherein all the above means are activated when the scene change frame mode information is input from the coding mode determining means.

4. The moving picture coding apparatus according to claim 2, wherein the scene change coding control means comprises:

a target scene-change-coding amount computing means for calculating the target amount of coding per frame by reducing the frame rate;

a coding limit monitoring means which, based on the maximum coding amount per frame defineld by the standard, monitors whether the amount of coding in the coding means exceeds the coding limit, every predetermined number of blocks, where the coding limit is set up for every predetermined number of blocks;

a coding interrupting means for interrupting the coding of the current frame when the present amount of coding exceeds the coding limit;

a quantization stepsize variational range checking means, which checks whether the input quantization stepsize falls within the specified range, and replaces the quantization stepsize with a closest value thereto falling within the specified range when the quantization stepsize falls out of the specified range, while uses the original quantization stepsize when the quantization stepsize falls within the specified range;

a quantization stepsize adding means which adds the quantization stepsize determined by the quantization stepsize variational range checking means;

an average quantization stepsize computing means for calculating the average value of the quantization stepsizes thus added;

an initial quantization stepsize computing means which computes the initial quantization stepsize based on the average quantization stepsize in the scene change frame and outputs the result to the quantization stepsize variational range checking means; and a quantization stepsize computing means which computes the quantization stepsize based on the target amount of coding, the information of the amount of coding not exceeding the coding limit and the average quantization stepsize for the previous frame and outputs the result to the quantization stepsize variational range checking means, wherein all the above means are activated when the post scene change mode information is input from the coding mode determining means.

5. The moving picture coding apparatus according to claim 2, wherein the specific area enhancement coding control means comprises:

a target specific-area-enhancement coding amount computing means for calculating the target amount of coding per frame;

a target coding amount computing means for specific area allocation which, based on the information as to skip blocks from the block skip determining means, the information as to the specific area extracted by the specific area extracting means and the information as to the target amount of coding from the target specific-area-enhancement coding amount computing means, computes the amount of coding to be allotted for the specific area and that for other than the specific area;

a coding limit monitoring means which, based on the maximum coding amount per frame defined by the standard, monitors whether the amount of coding in the coding means exceeds the coding limit, every predetermined number of blocks, where the coding limit is set up for every predetermined number of blocks;

a coding interrupting means for interrupting the coding of the current frame when the present amount of coding exceeds the coding limit;

a quantization stepsize variational range checking means, which checks whether the input quantization stepsize falls within the specified range, and replaces the quantization stepsize with a closest value thereto falling within the specified range when the quantization stepsize falls out of the specified range, while uses the original quantization stepsize when the quantization stepsize falls within the specified range;

a quantization stepsize adding means which adds the quantization stepsize determined by the quantization stepsize variational range checking means;

an average quantization stepsize computing means for calculating the average value of the quantization stepsizes thus added;

an initial quantization stepsize computing means which computes the initial quantization stepsize based on the average quantization stepsize in the post-scene change mode and outputs the result to the quantization stepsize variational range checking means; and a quantization stepsize computing means which computes the quantization stepsize based on the target amount of coding, the information of the amount of coding not exceeding the coding limit, the information as to skip blocks from the block skip determining means, the specific area information from the specific area extracting means and the average quantization stepsize for the previous frame and outputs the result to the quantization stepsize variational range checking means, wherein all the above means are activated when the specific area mode information is input from the coding mode determining means.

* * * * *